US011461869B2

(12) United States Patent
Lee et al.

(10) Patent No.: US 11,461,869 B2
(45) Date of Patent: Oct. 4, 2022

(54) SLAB BASED MEMORY MANAGEMENT FOR MACHINE LEARNING TRAINING

(71) Applicant: Samsung Electronics Co., Ltd., Suwon-si (KR)

(72) Inventors: Joo Hwan Lee, San Jose, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1174 days.

(21) Appl. No.: 15/976,765

(22) Filed: May 10, 2018

(65) Prior Publication Data

US 2019/0286991 A1   Sep. 19, 2019

Related U.S. Application Data

(60) Provisional application No. 62/642,994, filed on Mar. 14, 2018.

(51) Int. Cl.
*G06T 1/60* (2006.01)
*G06T 1/20* (2006.01)
(Continued)

(52) U.S. Cl.
CPC .................. *G06T 1/60* (2013.01); *G06T 1/20* (2013.01); *G09G 5/363* (2013.01); *G06F 12/023* (2013.01);
(Continued)

(58) Field of Classification Search
CPC .......... G06N 3/063; G06N 3/08; G06N 3/084; G06T 1/60; G06T 1/20; G09G 5/363;
(Continued)

(56) References Cited

U.S. PATENT DOCUMENTS 9,607,355 B2   3/2017   Zou et al.
9,928,034 B2   3/2018   Merrill, III
(Continued)

FOREIGN PATENT DOCUMENTS

CN   104036451 A   9/2014
CN   105205014 A   12/2015
(Continued)

OTHER PUBLICATIONS

Yang, Xuan, et al., "A Systematic Approach to Blocking Convolutional Neural Networks", arXiv:1606.04209, [cs.DC] Jun. 14, 2016, 12 pages.
(Continued)

*Primary Examiner* — Xilin Guo
(74) *Attorney, Agent, or Firm* — Lewis Roca Rothgerber Christie LLP (57) ABSTRACT

A system and method for machine learning, with a processing circuit executing an operating system, the processing circuit being connected to a first memory and to a second memory. In some embodiments, the method includes: requesting, by a user level process, from the operating system, a first memory allocation from the first memory, the first memory allocation including a plurality of first segments, a first segment of the plurality of first segments having a size sufficient to store a data object of a first kind; determining, by the user level process, that a result of a first calculation will be a data object of the first kind; and in response to determining that the result of the first calculation will be a data object of the first kind: determining, by the user level process, that none of the first segments are unused.

20 Claims, 5 Drawing Sheets

(51) Int. Cl.
*G09G 5/36* (2006.01)
*G06N 3/08* (2006.01)
*G06F 12/10* (2016.01)
*G06F 12/02* (2006.01)

(52) U.S. Cl.
CPC ........ *G06F 12/10* (2013.01); *G06F 2212/251* (2013.01); *G06F 2213/0026* (2013.01); *G06N 3/08* (2013.01); *G06N 3/084* (2013.01)

(58) Field of Classification Search
CPC .............. G06F 12/10; G06F 2212/251; G06F 2213/0026; G06F 12/023
See application file for complete search history.

(56) References Cited

U.S. PATENT DOCUMENTS

| | | |
|---|---|---|
| 10,296,074 B2 | 5/2019 | Ruan et al. |
| 2005/0240745 A1 | 10/2005 | Iyer et al. |
| 2008/0109171 A1 | 5/2008 | McGraw et al. |
| 2012/0188263 A1 | 7/2012 | Becchi et al. |
| 2013/0050260 A1 | 2/2013 | Reitan |
| 2013/0342552 A1 | 12/2013 | Apodaca |
| 2014/0055467 A1 | 2/2014 | Bittner et al. |
| 2016/0217369 A1 | 7/2016 | Annapureddy et al. |
| 2017/0032487 A1 | 2/2017 | Ashari et al. |
| 2017/0286284 A1* | 10/2017 | Risinger ................... G06T 1/20 |
| 2018/0004530 A1 | 1/2018 | Vorbach |
| 2018/0307972 A1* | 10/2018 | Feng .................... G06F 12/1009 |
| 2019/0227718 A1* | 7/2019 | Frolikov ............. G06F 12/0646 |
| 2019/0324759 A1* | 10/2019 | Yang ..................... G06N 3/084 |

FOREIGN PATENT DOCUMENTS

| | | |
|---|---|---|
| EP | 3158529 B1 | 9/2020 |
| TW | 201635143 A | 10/2016 |
| TW | 201805809 A | 2/2018 |

OTHER PUBLICATIONS

Sidhu, Sammy, et al., "Rafiqi: A GPU-Based Deep Learing Model Serving System", Department of Electrical Engineering and Computer Sciences, University of Berkeley, 2017, 9 pages.

* cited by examiner

SLAB BASED MEMORY MANAGEMENT FOR MACHINE LEARNING TRAINING

CROSS-REFERENCE TO RELATED APPLICATION(S)

The present application claims priority to and the benefit of U.S. Provisional Application No. 62/642,994, filed Mar. 14, 2018, the entire content of which is incorporated herein by reference.

FIELD

One or more aspects of embodiments according to the present invention relate to machine learning, and more particularly to a system and method of memory management for machine learning.

BACKGROUND

Data-centric machine learning training examines the patterns in massive amounts of data to learn models. In some systems, computing units and storage units are separated, and large amounts of data are transferred from solid state drives (SSDs) to central processing units (CPUs) through slow interfaces, which leads to performance and energy inefficiency. In-storage machine learning training with embedded graphics processing units (GPUs) may be an improved solution that moves data closer to code, thus reducing the inefficiency of some related art architectures.

Integrating GPUs within SSDs may, however, introduce a new challenge related to GPU dynamic random access memory (DRAM) size. Power and energy constraints of an SSD may limit the DRAM size within the SSD, thus reducing the efficiency of machine learning training on a GPU embedded within an SSD. Related art heterogeneous memory management schemes for GPUs, which may manage memory with page granularity, may perform poorly in machine learning training operations, increasing memory management overhead.

Thus, there is a need for an efficient memory management scheme to enable in-storage machine learning training.

SUMMARY

According to an embodiment of the present invention there is provided a method for machine learning, with a processing circuit executing an operating system, the processing circuit being connected to a first memory and to a second memory, the method including: requesting, by a user level process running on the processing circuit, from the operating system, a first memory allocation from the first memory, the first memory allocation including a plurality of first segments, a first segment of the plurality of first segments having a size sufficient to store a data object of a first kind; determining, by the user level process, that a result of a first calculation will be a data object of the first kind; in response to determining that the result of the first calculation will be a data object of the first kind: determining, by the user level process, that all of the first segments are in use, and in response to determining, by the user level process, that all of the first segments are in use, identifying a least recently used first segment from among the plurality of first segments, the least recently used first segment having a physical address, and copying, by the user level process, contents of the least recently used first segment to the second memory; performing the first calculation; and storing the result of the first calculation in the least recently used first segment.

In one embodiment, the data object of the first kind is a forward activation in a neural network.

In one embodiment, the data object of the first kind is a back propagation activation in a neural network.

In one embodiment, the method includes instantiating, by the user level process, a first virtual pointer as an instance of a virtual pointer class, wherein the determining, by the user level process, that all of the first segments are in use includes executing a member function, of the virtual pointer class, for determining whether all of the first segments are in use.

In one embodiment, the storing of the result of the first calculation in the least recently used first segment includes assigning to a member variable of the first virtual pointer a physical address of the least recently used first segment.

In one embodiment, the copying, by the user level process, of contents of the least recently used first segment to the second memory includes changing a value of a member variable of a second virtual pointer from the physical address of the least recently used first segment to a physical address in the second memory.

In one embodiment, the method includes: requesting, by the user level process, from the operating system, a second memory allocation from the first memory, the second memory allocation including a plurality of second segments, a second segment of the plurality of second segments having a size sufficient to store a data object of a second kind; determining, by the user level process, that a result of a second calculation will be a data object of the second kind, in response to determining that the result of the second calculation will be a data object of the second kind: determining, by the user level process, that none of the second segments are unused; and in response to determining, by the user level process, that none of the second segments are unused, identifying a least recently used second segment from among the plurality of second segments, the least recently used second segment having a physical address, and copying, by the user level process, contents of the least recently used second segment to the second memory; performing the second calculation; and storing the result of the second calculation in the least recently used second segment.

In one embodiment, the second kind of data objects includes weights in a neural network.

In one embodiment, the second kind of data objects further includes gradients of weights in the neural network.

In one embodiment, the processing circuit is a graphics processing unit.

In one embodiment, the first memory is a memory on a memory bus of the graphics processing unit.

In one embodiment, the second memory is connected to the graphics processing unit through a peripheral component interconnect express (PCIe) connection.

According to an embodiment of the present invention there is provided a system for machine learning, the system including: a processing circuit; a first memory connected to the processing circuit; a second memory connected to the processing circuit; and a non-transitory computer-readable storage medium storing instructions that when executed by the processing circuit cause the processing circuit to: execute an operating system; and start a user level process within the operating system, the user level process being configured to: request, from the operating system, a first memory allocation from the first memory, the first memory allocation including a plurality of first segments, each first segment having a size sufficient to store a data object of a first kind; determine that a result of a first calculation will be a data object of the first kind; in response to determining that the result of the first calculation will be a data object of the first kind: determine that none of the first segments are unused; and in response to determining that none of the first segments are unused, identify a least recently used first segment from among the plurality of first segments, the least recently used first segment having a physical address, and copy contents of the least recently used first segment to the second memory; perform the first calculation; and store the result of the first calculation in the least recently used first segment.

In one embodiment, the data object of the first kind is a forward activation in a neural network.

In one embodiment, the data object of the first kind is a back propagation activation in a neural network.

In one embodiment, the processing circuit is a graphics processing unit.

In one embodiment, the first memory is a memory connected to the graphics processing unit through a memory management unit.

In one embodiment, the second memory is a memory connected to the graphics processing unit through a peripheral component interconnect express (PCIe) connection.

According to an embodiment of the present invention there is provided a system, including: a graphics processing unit; a first memory, connected to the graphics processing unit through a memory management unit; a host connected to the first memory through a peripheral component interconnect express (PCIe) connection, the host including: a central processing unit, and a second memory, the graphics processing unit being connected to a non-transitory computer-readable storage medium storing instructions that when executed by the graphics processing unit cause the graphics processing unit to: execute an operating system; and start a user level process within the operating system, the user level process being configured to: request, from the operating system, a first memory allocation from the first memory, the first memory allocation including a plurality of first segments, each first segment having a size sufficient to store a data object of a first kind; determine that a result of a first calculation will be a data object of the first kind; in response to determining that the result of the first calculation will be a data object of the first kind: determine that none of the first segments are unused; and in response to determining that none of the first segments are unused, identify a least recently used first segment from among the plurality of first segments, the least recently used first segment having a physical address, and copy contents of the least recently used first segment to the second memory; perform the first calculation; and store the result of the first calculation in the least recently used first segment.

In one embodiment, the data object of the first kind is a forward activation in a neural network.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for slab based memory management for machine learning training provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

For some applications using a graphics processing unit (GPU), e.g., certain machine learning applications, the main performance bottleneck is limited GPU memory. Heterogeneous memory management, utilizing a slower but larger memory in combination with fast GPU memory to provide a large memory space to a GPU, may be used to reduce the performance impact of the performance bottleneck; however, such approaches may not be well suited for machine learning applications. As such, in some embodiments, the unique characteristic of machine learning training for efficient machine learning training are used to provide a memory management system adapted to machine learning applications.

Figure 1:
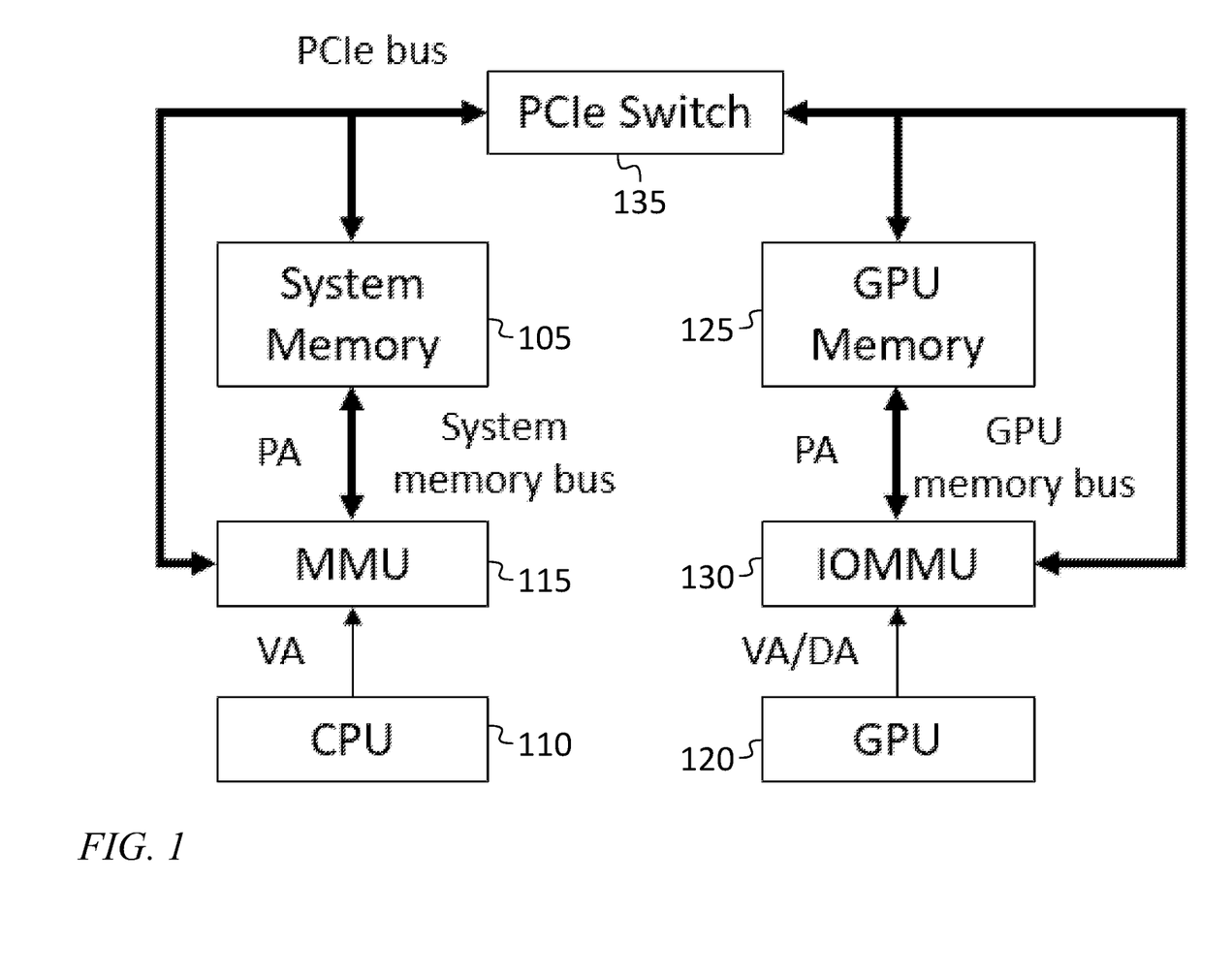
FIG. 1 is a block diagram of a system for machine learning, according to an embodiment of the present invention.

FIG. 1 shows a system for performing machine learning operations, in some embodiments. The system includes a host including system memory 105 connected to a host central processing unit (CPU) 110 through a memory management unit (MMU) 115. A GPU 120 performs computations using data retrieved from a GPU memory 125 and saves the results of the operations in the GPU memory 125. Access, by the GPU 120 to the GPU memory 125, is through an input-output memory management unit (IOMMU) 130 which may, like the CPU 110 and the GPU 120, be a processing circuit (discussed in further detail below). A peripheral component interconnect express (PCIe) bus and PCIe switch form connections between the memory management unit 115, the system memory 105, the GPU memory 125, and the input-output memory management unit 130. Memory access by the CPU 110 is performed with virtual memory address (VA) i.e., any given virtual address is translated to physical memory address by the MMU 115. Memory access by the GPU 120 may either be performed using virtual memory addressing when unified virtual addressing is supported, or using device memory addresses (DA) when unified addressing is not supported. The given address is translated to a corresponding physical memory address by the input-output memory management unit 130 connected to the GPU 120.

The interconnect used to access a data object in memory may depend on the computing unit and the location of the data object. The system memory bus is used for access by the CPU 110 to a data object allocated on the system memory 105, and the GPU memory bus is used for access by the GPU 120 to a data object allocated on the GPU memory 125. For access by the CPU 110 to a data object on the GPU memory 125 and for access by the GPU 120 to a data object on the system memory 105, data object migration is performed via the PCIe bus.

Figure 2:
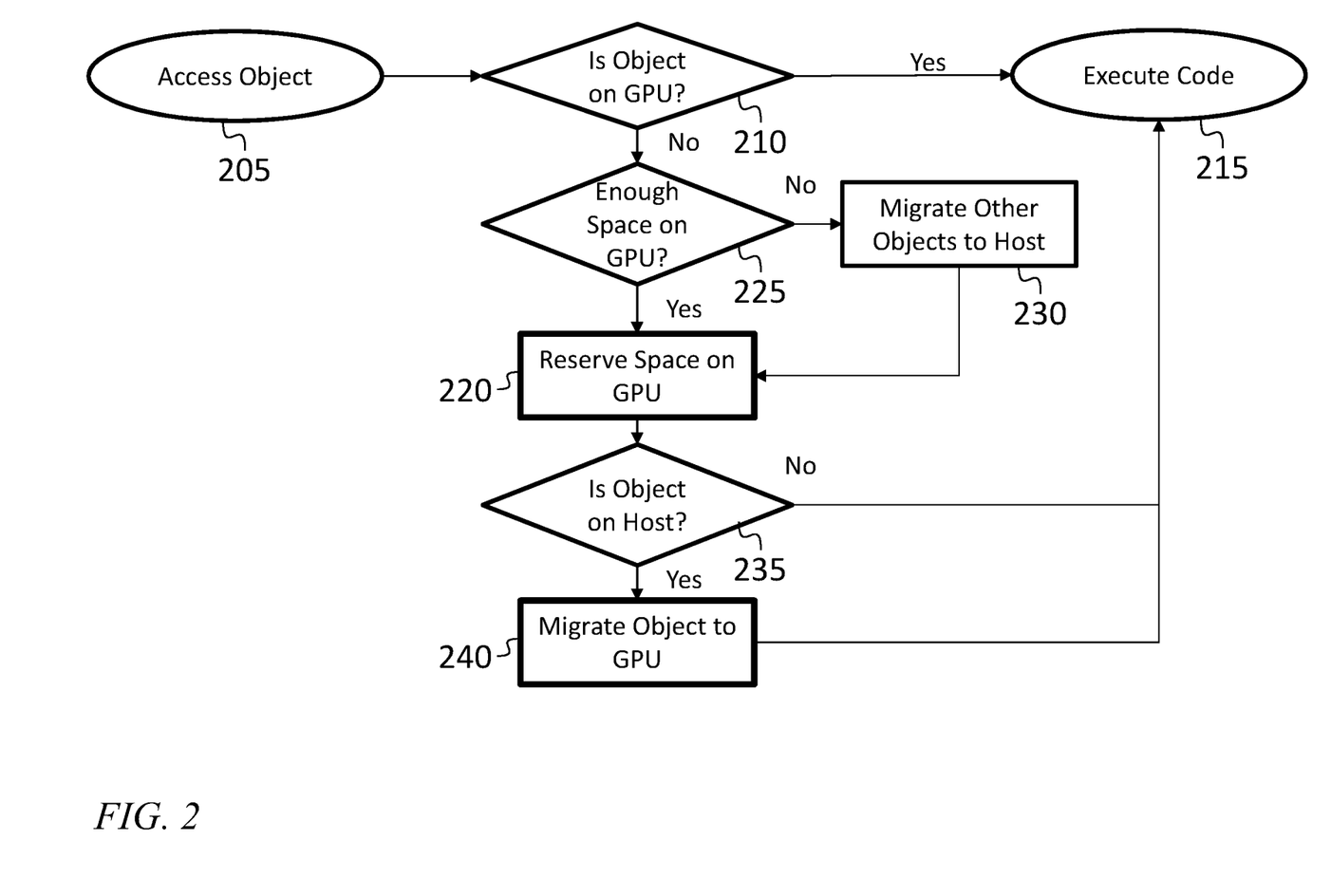
FIG. 2 is a flow chart for a memory access on a graphics processing unit, according to an embodiment of the present invention.

FIG. 2 shows the overall flow of data object migration in some embodiments when using system memory 105 on the host as slow memory. The slow memory does not need to be system memory on a host, and it may be any type of memory device such as a nonvolatile memory express (NVMe) solid state drive (SSD) or an internal flash array within an SSD device that can be accessed via an SSD-internal interconnect. A GPU within an SSD device may directly access the flash array of the SSD device, for example, by communicating with the flash controller via an SSD-internal interconnect. As shown in FIG. 2, before executing the GPU code accessing (reading or writing) a data object, the system employs a method beginning at 205. The system first checks, at 210, whether the data object is in GPU memory. If the data object is resident in the GPU memory, the system proceeds, at 215, to execute the GPU code. If the data object is not resident in the GPU memory, the system reserves, at 220, space in GPU memory for the accessed data object. Before reserving space in GPU memory, the system checks, at 225, whether there is enough space in GPU memory, and migrates other data objects to the host memory (e.g., the system memory 105), at 230, if not. Migration (or "eviction") to the host memory may be done on the basis of least recent use, i.e., the least recently used data object in GPU memory may be migrated to the host memory when space is needed in the GPU memory 125. After reserving space, the system checks, at 235, whether the data object is allocated on slow memory such as system memory 105 on the host; if it is, the system performs migration, at 240 of the data object from the slow memory to GPU memory, and proceeds, at 215, to execute the GPU code. If the data object is not allocated on, e.g., the system memory 105, then (assuming the access is a write access) the system proceeds, at 215, to execute the GPU code.

In some embodiments, a user level process executing on the GPU (e.g., a user process performing machine learning training operations on a deep neural network) may request one or more memory allocations in the GPU memory 125 from the operating system running on the CPU 110 (e.g., from a kernel level process that performs operating system level memory management), and perform slab based memory management at the user process level (as discussed in further detail below), instead of allocating and deallocating individual data objects through the operating system, thereby avoiding the overhead incurred when memory allocation and deallocation are performed by the operating system, and avoiding or reducing memory fragmentation.

Figure 3:
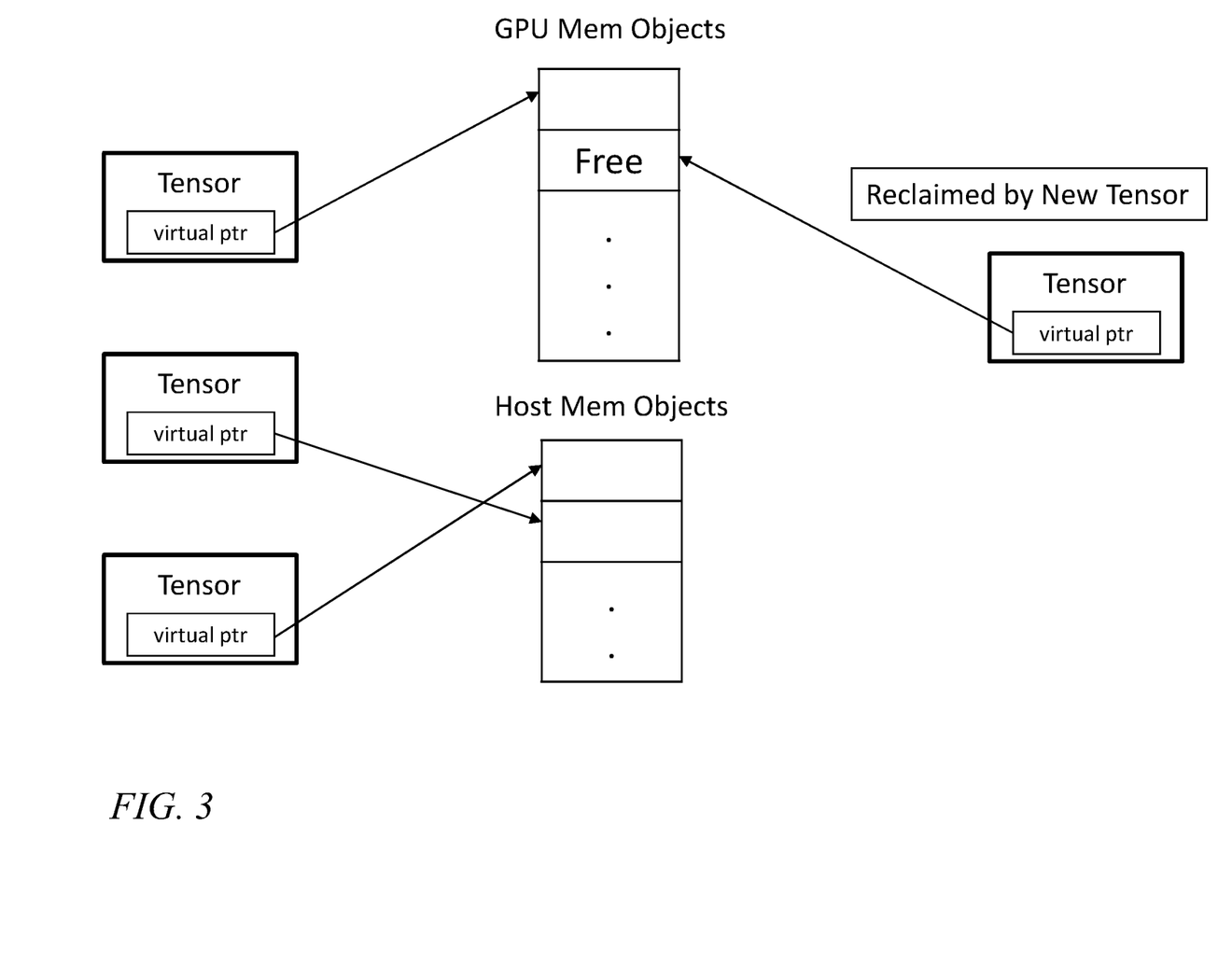
FIG. 3 is a memory diagram, according to an embodiment of the present invention.

FIG. 3 illustrates how the user level process retains memory allocated by the operating system for subsequent allocation to data objects. Instead of each tensor in the machine learning framework having a pointer only referring to GPU data objects (i.e., pointing directly to a location in GPU memory 125, as may be the case in related art implementations) each tensor maintains a virtual pointer that can either refer to a GPU memory segment (i.e., for a data object stored in GPU memory 125) or a slow memory segment (i.e., a data object stored in slow memory, e.g., system memory 105). As used herein, a memory "segment" is a region of contiguous memory sufficiently large to store a data object. When the GPU data object pointed to by a tensor does not need to maintained because no reuse of the data object is anticipated, the system marks the segment of GPU memory in which the data object is stored as "free", i.e., the user level process changes the status of the memory segment (instead of deallocating the data object via the GPU device driver application programming interface (API)), so that the segment of GPU memory can be reclaimed by other tensors (i.e., used, by the user level process to store other tensors), as shown in FIG. 3.

Figure 4:
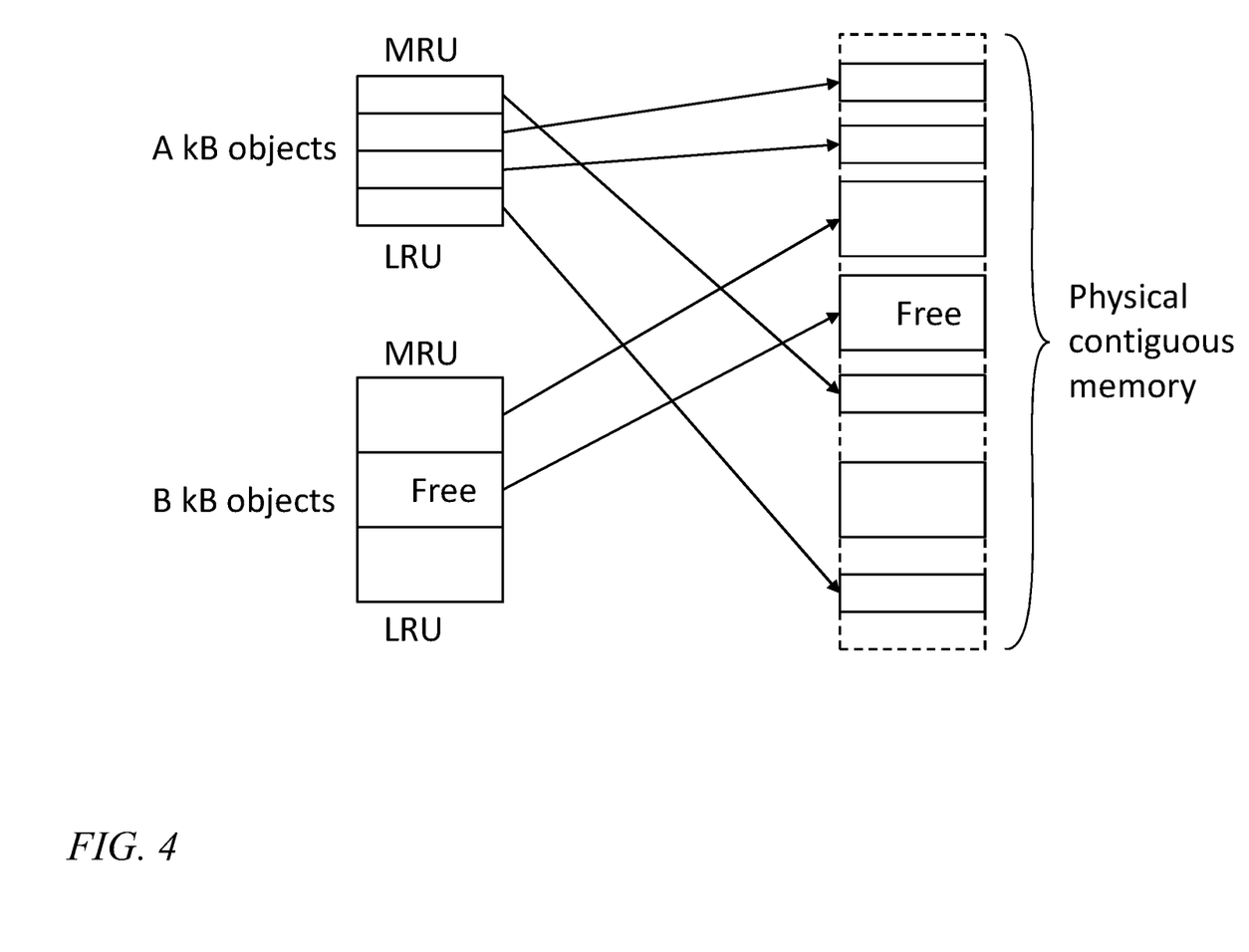
FIG. 4 is an illustration of slab based memory management, according to an embodiment of the present invention.

In some embodiments, the user level process utilizes slab based memory management (instead of managing data objects with page granularity, as may be done by some related art systems), taking advantage of the characteristic, of deep neural networks, that multiple data objects share a common type (and size) and that there are only limited number of data object types within a single neural network. FIG. 4 illustrates how the user level process performs slab based memory management, in some embodiments. The user level process maintains a set of lists, each list being a list of GPU data objects of the same type. Free memory segments are identified in each list so that they may be reused for subsequent allocations of the same type of objects.

For example, each data object may be identified by a virtual pointer, the virtual pointer being an instance of a virtual pointer class. The virtual pointer may include as member variables (i) data, which may be a tensor of a deep neural network (e.g., a weight, a gradient of a weight, a forward activation, or a back propagation activation) and (ii) a pointer to a location in physical memory, e.g., either in GPU memory 125 or in slow memory (e.g., in system memory 105).

A first list may be kept for virtual pointers of a first size (which may be referred to as a first segment size). After the user level process requests a first allocation from the operating system (to accommodate a plurality of data objects of a first kind, having a size equal to the first size) the user level process creates a list of "physical pointers" each pointing to the first address of a region, or "segment" of physical memory sufficiently large to store one of the data objects of the first size. The user level process associates with each physical pointer (i) a flag indicting whether the memory is in use or free, and, if the segment is in use, (ii) a pointer to a virtual pointer pointing to (i.e., having reserved) the segment and (iii) a time of most recent use. This list is referenced by any virtual pointer that needs space in the GPU memory 125, to either reserve an already free segment of memory, or to evict a least recently used data object and to then reserve the segment freed by the eviction. Management of memory on the host may be performed in the same manner, with the user level process requesting, for example, a first allocation of system memory 105 to be used to store a plurality of data objects upon eviction from the GPU memory 125.

The user level process may construct an analogous second list for a plurality of data objects of a second kind, each having a second size, and the user level process may construct other analogous lists for data objects of other kinds and other sizes. For example, in a deep neural network, weights, gradients of weights may all have the same size, e.g., a first size. Forward activations, and back propagation activations may also all have the same size, e.g., a second size.

The virtual pointer may have, as member functions, functions for performing the operations of FIG. 2, e.g., migrating the data to the system memory 105 when the data of the virtual pointer are the least recently used, of the desired segment size, in the GPU memory 125. The virtual pointers may perform memory migration with a granularity corresponding to the size of the data objects. FIG. 4 shows an example in which the system utilizes a least recently used (LRU) data object replacement policy for each list. FIG. 4 shows that the least recently used GPU data object within a list of a certain data object type is migrated to slow memory when a GPU data object of the same type needs to be allocated in GPU memory and when there is no free or "unused" segment of the same type in GPU memory.

Figure 5:
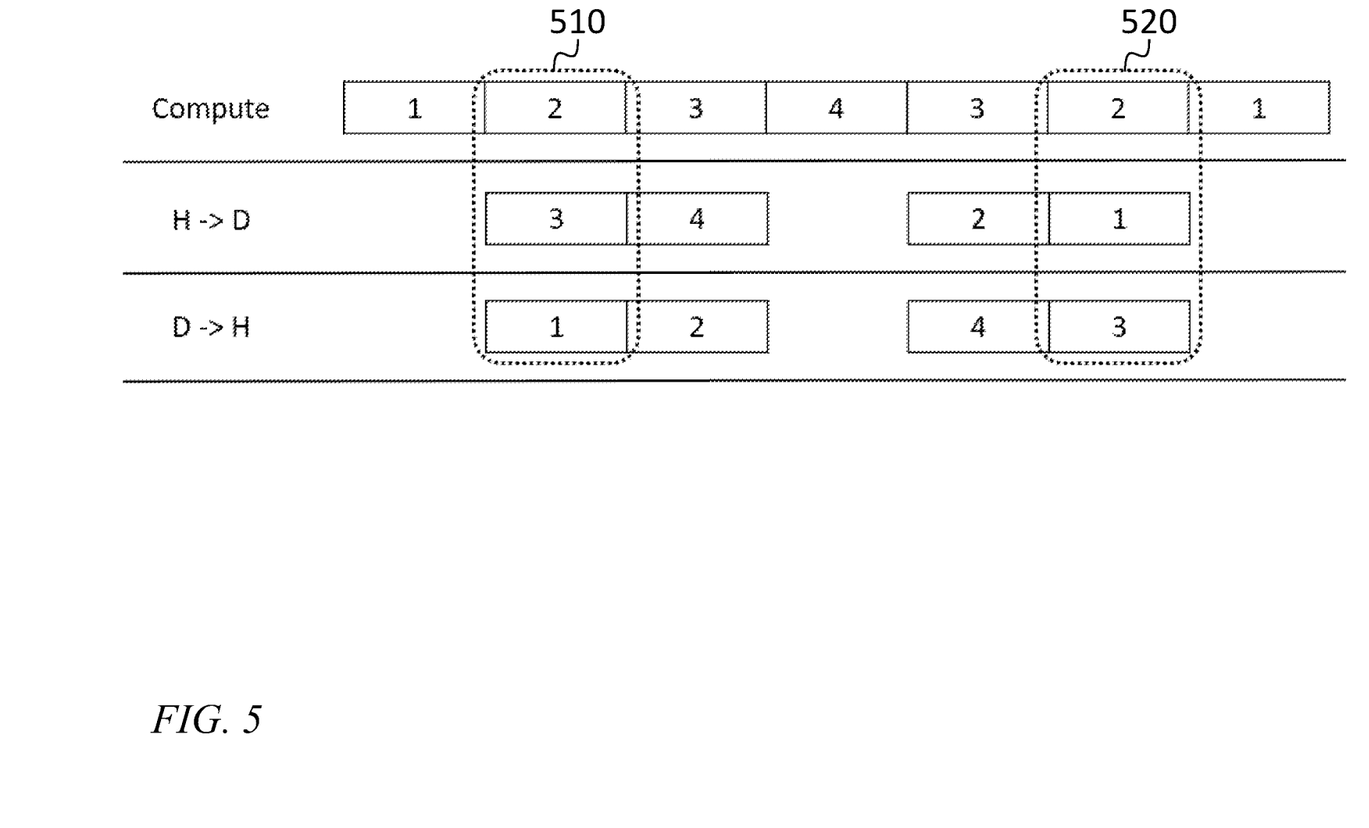
FIG. 5 is an illustration of memory object migration, according to an embodiment of the present invention.

FIG. 5 illustrates how an LRU replacement policy may operate in a simplified example in which GPU memory can hold two data objects. In this example, there are four data objects used in GPU computations; these are labeled "1" through "4" in FIG. 5. Before executing GPU code that will use data object "3", the system migrates (at 510) data object "3" to GPU memory (i.e., from the host "H" to the device (the GPU) "D") for the next GPU computation to be executed. Since the GPU memory can hold two data objects, the system performs migration of data object "1" from GPU memory to slow memory (system memory 105 on the host). The data object "1" is migrated back to GPU memory before being used as shown in FIG. 5.

In some embodiments, the system decides the slab size by profiling. The system utilizes the characteristic that the size and the number of data objects during machine learning training remain the same on different iterations. During a first iteration of machine learning training, the system collects memory usage pattern such as the type of data objects and the number of data objects with each type. Before starting the second iterations, the system determines, using a simulation, the optimal number of entries within each list to achieve the best predicted performance. In such an embodiment, the slab size is application-specific for each neural network, enabling optimal performance for machine learning training.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for slab based memory management for machine learning training have been specifically described and illustrated herein, many modifications and variations will be apparent to those skilled in the art. Accordingly, it is to be understood that a system and method for slab based memory management for machine learning training constructed according to principles of this invention may be embodied other than as specifically described herein. The invention is also defined in the following claims, and equivalents thereof.

What is claimed is:

1. A method for machine learning, with a processing circuit executing an operating system, the processing circuit being connected to a first memory and to a second memory, the method comprising:
   requesting, by a user level process running on the processing circuit, from the operating system, a first memory allocation from the first memory, the first memory allocation comprising a plurality of first segments, a first segment of the plurality of first segments having a size sufficient to store a data object of a first kind;
   determining, by the user level process, that a result of a first calculation will be a data object of the first kind;
   in response to determining that the result of the first calculation will be a data object of the first kind:
      determining, by the user level process, that all of the first segments are in use, and
      in response to determining, by the user level process, that all of the first segments are in use,
         identifying a least recently used first segment from among the plurality of first segments, the least recently used first segment having a physical address, and
         copying, by the user level process, contents of the least recently used first segment to the second memory;
   performing the first calculation; and
   storing the result of the first calculation in the least recently used first segment.

2. The method of claim 1, wherein the data object of the first kind is a forward activation in a neural network.

3. The method of claim 1, wherein the data object of the first kind is a back propagation activation in a neural network.

4. The method of claim 1, further comprising instantiating, by the user level process, a first virtual pointer as an instance of a virtual pointer class,
   wherein the determining, by the user level process, that all of the first segments are in use comprises executing a member function, of the virtual pointer class, for determining whether all of the first segments are in use.

5. The method of claim 4, wherein the storing of the result of the first calculation in the least recently used first segment comprises assigning to a member variable of the first virtual pointer a physical address of the least recently used first segment.

6. The method of claim 5, wherein the copying, by the user level process, of contents of the least recently used first segment to the second memory comprises changing a value of a member variable of a second virtual pointer from the physical address of the least recently used first segment to a physical address in the second memory.

7. The method of claim 1, further comprising:
   requesting, by the user level process, from the operating system, a second memory allocation from the first memory, the second memory allocation comprising a plurality of second segments, a second segment of the plurality of second segments having a size sufficient to store a data object of a second kind;
   determining, by the user level process, that a result of a second calculation will be a data object of the second kind;
   in response to determining that the result of the second calculation will be a data object of the second kind:
      determining, by the user level process, that none of the second segments are unused; and
      in response to determining, by the user level process, that none of the second segments are unused,
         identifying a least recently used second segment from among the plurality of second segments, the least recently used second segment having a physical address, and
         copying, by the user level process, contents of the least recently used second segment to the second memory;
   performing the second calculation; and
   storing the result of the second calculation in the least recently used second segment.

8. The method of claim 7, wherein the second kind of data objects includes weights in a neural network.

9. The method of claim 8, wherein the second kind of data objects further includes gradients of weights in the neural network.

10. The method of claim 1, wherein the processing circuit is a graphics processing unit.

11. The method of claim 10, wherein the first memory is a memory on a memory bus of the graphics processing unit.

12. The method of claim 11, wherein the second memory is connected to the graphics processing unit through a peripheral component interconnect express (PCIe) connection.

13. A system for machine learning, the system comprising:
   a processing circuit;
   a first memory connected to the processing circuit;
   a second memory connected to the processing circuit; and
   a non-transitory computer-readable storage medium storing instructions that when executed by the processing circuit cause the processing circuit to:
      execute an operating system; and
      start a user level process within the operating system,
   the user level process being configured to:
      request, from the operating system, a first memory allocation from the first memory, the first memory allocation comprising a plurality of first segments, each first segment having a size sufficient to store a data object of a first kind;
   determine that a result of a first calculation will be a data object of the first kind;
   in response to determining that the result of the first calculation will be a data object of the first kind:
      determine that none of the first segments are unused; and
      in response to determining that none of the first segments are unused,
         identify a least recently used first segment from among the plurality of first segments, the least recently used first segment having a physical address, and
         copy contents of the least recently used first segment to the second memory;
   perform the first calculation; and
   store the result of the first calculation in the least recently used first segment.

14. The system of claim 13, wherein the data object of the first kind is a forward activation in a neural network.

15. The system of claim 13, wherein the data object of the first kind is a back propagation activation in a neural network.

16. The system of claim 13, wherein the processing circuit is a graphics processing unit.

17. The system of claim 16, wherein the first memory is a memory connected to the graphics processing unit through a memory management unit.

18. The system of claim 16 wherein the second memory is a memory connected to the graphics processing unit through a peripheral component interconnect express (PCIe) connection.

19. A system, comprising:
- a graphics processing unit;
- a first memory, connected to the graphics processing unit through a memory management unit; and
- a host connected to the first memory through a peripheral component interconnect express (PCIe) connection, the host comprising:
  - a central processing unit, and
  - a second memory,
- the graphics processing unit being connected to a non-transitory computer-readable storage medium storing instructions that when executed by the graphics processing unit cause the graphics processing unit to:
  - execute an operating system; and
  - start a user level process within the operating system, the user level process being configured to:
    - request, from the operating system, a first memory allocation from the first memory, the first memory allocation comprising a plurality of first segments, each first segment having a size sufficient to store a data object of a first kind;
    - determine that a result of a first calculation will be a data object of the first kind;
    - in response to determining that the result of the first calculation will be a data object of the first kind:
      - determine that none of the first segments are unused; and
      - in response to determining that none of the first segments are unused,
        - identify a least recently used first segment from among the plurality of first segments, the least recently used first segment having a physical address, and
        - copy contents of the least recently used first segment to the second memory;
    - perform the first calculation; and
    - store the result of the first calculation in the least recently used first segment.

20. The system of claim 19, wherein the data object of the first kind is a forward activation in a neural network.

* * * * *